May 5, 1959   C. L. PETERSON ET AL   2,885,083
FILTER ASSEMBLY
Filed June 1, 1956   3 Sheets-Sheet 1

INVENTORS
C. LYNN PETERSON
BLODDIE L. DERRINGE
BY
Matthew & Edwards
ATTORNEYS

May 5, 1959 C. L. PETERSON ET AL 2,885,083
FILTER ASSEMBLY
Filed June 1, 1956 3 Sheets-Sheet 2

INVENTORS
C. LYNN PETERSON
BLODDIE L. DERRINGE
BY
ATTORNEYS

May 5, 1959  C. L. PETERSON ET AL  2,885,083
FILTER ASSEMBLY
Filed June 1, 1956  3 Sheets-Sheet 3

INVENTORS
C. LYNN PETERSON
BLODDIE L. DERRINGE
BY
ATTORNEYS

2,885,083

FILTER ASSEMBLY

C. Lynn Peterson, Salt Lake City, Utah, and Bloddie L. Derringe, Greensburg, Pa., assignors to Peterson Filters & Engineering Company, Salt Lake City, Utah, a corporation Application June 1, 1956, Serial No. 588,896

12 Claims. (Cl. 210—396)

This invention relates to improvements in leaf or disc filters and more particularly to improvements in segmented leaf filters and filter cake scraper assemblies mounted in cake removal relation to the filter leaves.

Rotary leaf or disc filters are well known in the prior art, and they generally include a plurality of relatively thin discs spaced along a hollow rotary shaft mounted in a tank so as to permit the discs to contact a body of filterable slurry. Each disc includes a plurality of segments or sectors which provide a series of compartments in substantial annular arrangement around the shaft. Each sector includes a bell portion and a body portion. The bell is attached to the shaft and the body portion is secured to the bell portion. Filter media encloses the body portion and is attached, generally, to the small neck of the bell portion. One very common form of filter media is a fabric bag which encloses the sector, forming a fairly tight-fitting cover. The loose end of the bag is then clamped tightly onto the neck of the sector bell. Where a wire cloth filter medium is used, one method of attachment includes soldering the free end of the wire to the bell portion, while the other end of the wire is secured to the outer part of the sector body.

When a scraper is utilized with the filter, a blade is extended radially along each side of the discs so that cake forming on the disc can be removed. The blades are normally interconnected at their outer ends so that each blade will follow the disc as it rotates, which is rarely a true circular plane. A front guide is provided for the outer end of each blade which holds the blade spaced from the filter media. The guide rides the outer portion of the sectors so that the blade does not come in contact with the wire cloth or other filter media.

In accordance with the present invention, an improved sector bell is provided into which the lower end of the filter media may be tucked so that the sector body may be registered with the bell to hold the filter medium therebetween. This novel method of holding filter medium reduces the quantity of filter medium required and greatly reduces the labor of fitting and soldering of wire around the complicated contour of the sector bell. The novel filter medium holding means reduces the number of component parts of the assembly. By tucking the inner end of the filter medium into the space between the bell and the body, the side surfaces of the bell remain unobstructed or uncovered with filter medium. A back scraper guide is provided for running on the unhindered surface of the bell so as to guide the blade in its position along the rotating surface of the disc and to prevent the blade from rubbing the surface of the filter medium. The inner or back mounting of the scraper is arranged so that the scraper may be assembled from beyond the filter leaves without getting in between the discs to secure the scraper on a back mount. The back mount is arranged so that the working edge of the scraper blade will be maintained at a preselected distance from the surface of the disc, providing a very uniform distance of juxtaposition of the working edge of the scraper to the surface of the disc even though the disc does not run on a true circular plane.

Included among the objects and advantages of the present invention is an improved disc filter with novel means for supporting the filter medium on the individual sectors of the filter discs. The improved filter medium fastening means reduces the quantity of filter medium required, thereby reducing the cost of the filter media. Substantially only the filtering area of the filter is covered with medium, and it does not require as much additional wire for holding the filter medium on the sectors. The invention, also, includes novel support means for a scraper blade for a disc filter, and a back guide for a disc filter scraper, adapted to maintain the working edge of the scraper blade at a selected distance from the surface of the filter medium.

Novel filter medium and means for its attachment to disc sectors is provided, which simplifies the attachment of such media to the sectors, which may be made of cloth filter media or woven wire.

These and other objects and advantages of the present invention will readily be understood by referring to the following description and illustrations in which.

Figure 1:
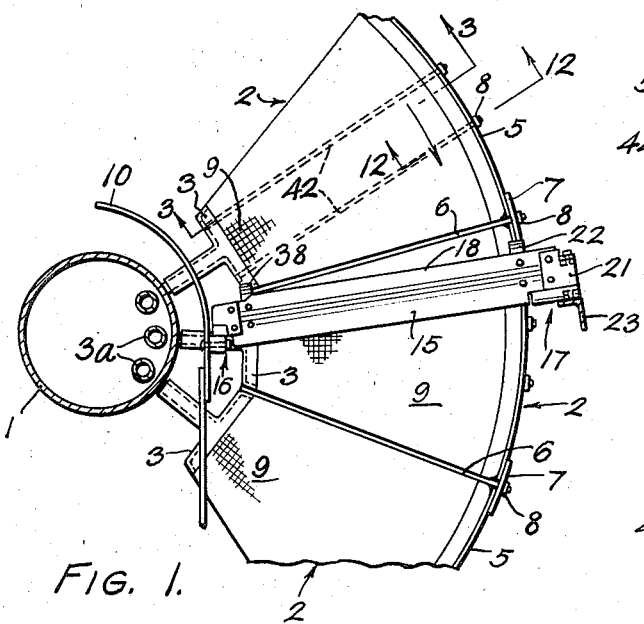
Fig. 1 is a partial section view of a section of a filter disc with a scraper assembled therewith.

One general structure of a leaf filter and its relation to the slurry holding tank is illustrated in copending application, Serial No. 172,607, filed July 7, 1950, for "Continuous Filter." The present invention has general applicability to leaf or disc filters, and there is no intent to limit the invention to the specific devices illustrated.

As illustrated, a hollow rotary shaft 1 having a series of drainage pipes 3a mounted therein supports a series of filter sectors shown by the general figure number 2 mounted in side-by-side relation to form an annular or disc filter surface. Each sector includes a sector bell 3 and a body portion 4 secured together by a peripheral band 5 and radial rods 6. The radial rods 6 extend through a sector clamp 7 and are secured in place by means of a nut 8. Filter medium 9 is secured around the body of the sector covering both sides of the body and forming the filtering surface thereon. The body of the sector is grooved or fluted to provide spaces for liquid to run along the sector body through the hollow bell 3 in drainage pipes 3a in the hollow shaft 1. An arcuate shield or shroud 10, mounted on the lower portion of the tank of filter, the connection is not illustrated, extends over the shaft and provides openings through which the filter discs revolve. A scraper blade 15 is mounted on a back support assembly, shown in general by numeral 16, and a front support, shown in general by numeral 17. The blade 15 is juxtaposed so that its working edge 18 is uniformly spaced from the surface of the sector discs, and is arranged to follow the surface of the discs as they rotate and move in and out of a true circular plane. Disc filters are generally very large pieces of equipment, having discs of six feet or more in diameter and therefore having a large radial span for each sector. Cost and function do not permit building a machine rigid enough to have the discs run in a perfectly true circular plane; further, it is not necessary that the discs run in a true plane. The front guide 17 includes a blade support block 21 to which the blade 15 is secured, and a front guide 22 secured to the blade and arranged to ride on the peripheral ring 5. The support block 21 is attached to a mirror image support block for the opposed blade, i.e. the blade on the opposite side of the disc. The blocks are connected together in such a manner as to make them conjointly follow the travel of the peripheral ring 5 out of true circular alignment. The blocks rest on and slide on an angle support 23 which is secured to the wall of the tank, the connection of the angle to the wall is not illustrated.

Figure 2:
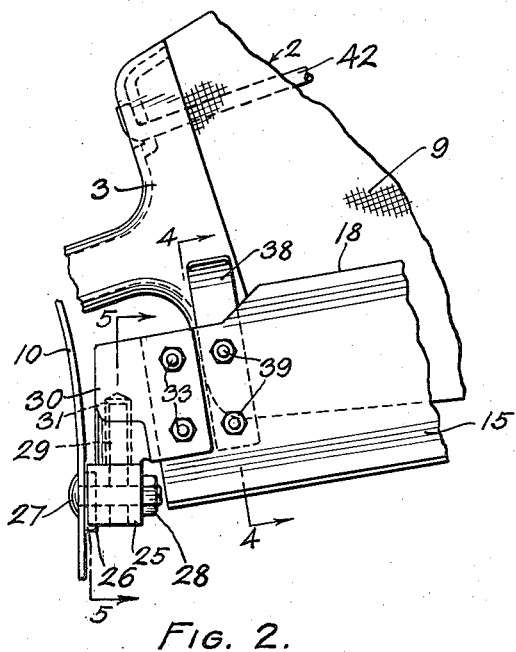
Fig. 2 is an enlarged detail of the back scraper support and back guide.
Figure 5:
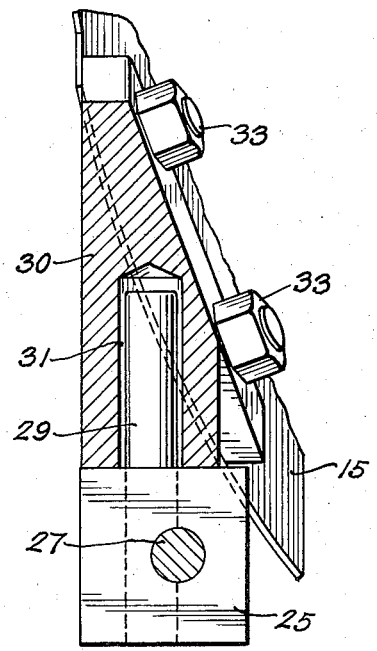
Fig. 5 is a detail view of the back mount blade holder.
Figure 6:
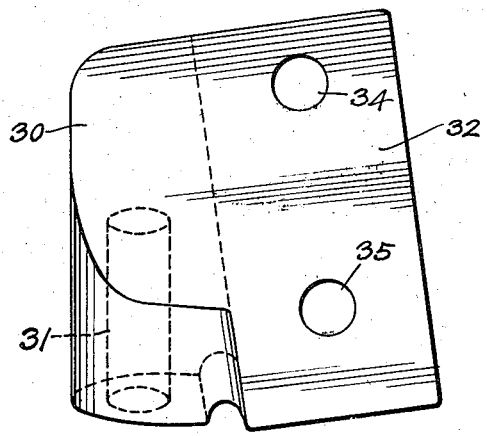
Fig. 6 is a perspective view of a back blade holder which is arranged to be mounted on a back support.

The back support, illustrated in Figs. 2, 5, and 6, includes a pivot block 25 mounted on a lock washer 26 and secured to the shroud 10 by means of a carriage bolt 27 and a nut 28. A pin 29 is secured in the block 25, the block being arranged to support the pin in substantially vertical position. A blade support or back vise 30 includes a bore 31 which is larger in diameter than the vertical pin 29, and is arranged to fit loosely over the vertical pin 29. The blade 15 is supported on a face 32 of the block 30, and is held in position by means of bolt and nut assemblies 33 extended through holes 34 and 35 on the block. In the preferred form, the scraper for the sectors is mounted at an acute angle to the surface of the filter disc positioning the bottom of the scraper away from the sectors. By having the bore slightly larger than the vertical pin 29 and by using a heavy gear dressing grease rusting and freezing of the pin is eliminated.

Figure 4:
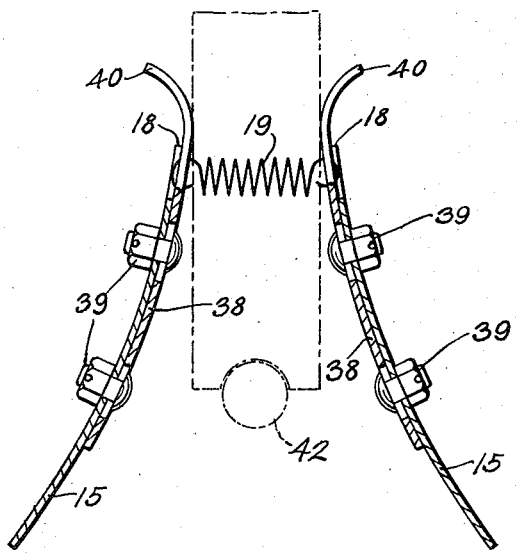
Fig. 4 is a schematic view of a pair of guide shoes in place on a filter sector.

A guide shoe 38, Fig. 4, may be mounted on each end of the blade by means of bolt and nut assemblies 39. The guide has an outwardly curved tip 40 which rides along a surface of the sector to prevent catching in crevices and bumps on the sector surfaces. A spring 19 fastened to each of the shoes 38 on the outer end of the blade keep the scrapers in correct spaced alignment with the sector surfaces.

Figure 9:
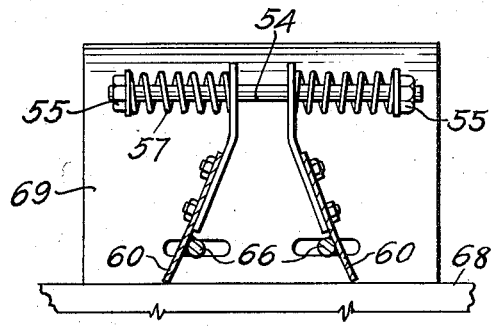
Fig. 9 is an enlarged detail of a scraper tension and positioning assembly taken along lines 9—9 of Fig. 8.

During scraping of cake from the surface of the sectors the scraping blade must be maintained in correct spacing. Once the blade is pushed out of alignment by misalignment or by ridges between sector bells, it will not return to a close positioning and cake builds up under the blade. To prevent this and to positively maintain the scraper blades 15 in position, a spring 19, Fig. 4, is mounted on guides 40 to maintain spring tension on the blades. A modified spring arrangement is illustrated in Fig. 9 where a bolt 54 is mounted on tension arms 56 and held by nuts 55. A spring 57 is mounted on the bolt 54 between one nut and the adjacent tension arm so that compressing the spring therebetween will pull the two tension arms together and hold them tightly on the disc. A counterweight could be used in the place of the spring to hold the tension arms together.

Figure 3:
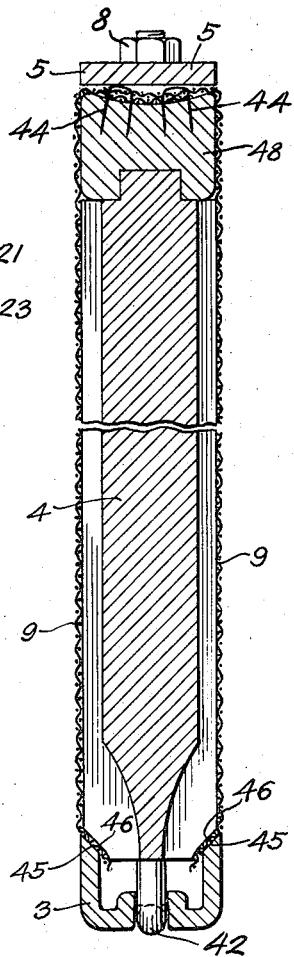
Fig. 3 is a cross-sectional view of a filter sector taken along section line 3—3 of Fig. 1.
Figure 12:
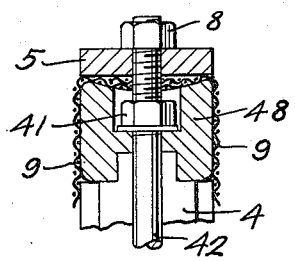
Fig. 12 is an enlarged detail in partial section of the upper assembly of a disc sector.

The sector illustrated in Fig. 3 has a body 4 of wooden construction and a sector bell 3 having bevelled outermost surface 45 sloped inwardly to accommodate registering surfaces 46 of the sector body. The inner end 47 of the filter medium 9 is tucked into the sector bell between the surfaces 45 and 46. The outer end of the medium is pulled around cap 48 and is stapled by means of staples 44 thereto. The sides are then stapled to the sides of the sectors (not shown in the drawings) to complete the covering. The inner end may be tacked to the sector body prior to insertion into the bell 3 to make sure the medium is held down while it is being assembled. The clamp 5 is then put on the assembled disc to hold the assembly in place and the medium to the sector. In Fig. 12 the details of the clamp arrangement for the sector is shown, where a nut 41 mounted on rod 42 holds cap 48 and sector body 4 onto the sector bell. The clamp rod 5 is secured to the sectors by means of a nut 8 to complete the assembly. In this manner the filter septum is securely maintained on the individual sectors of the discs.

Figure 7:
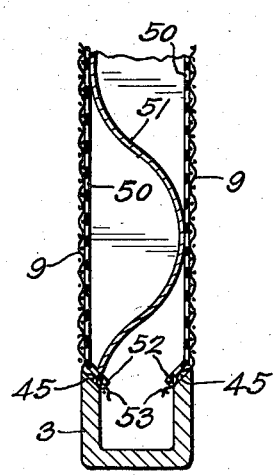
Fig. 7 is a partial sectional view of a filter sector showing the locking arrangement for the filter medium on an all-metal filter sector body.

The material used to construct the body of the sector bell, however, does not limit the application of the bevelled lock feature of the present invention. In Fig. 7, a metal sector is illustrated in position with a bell having the bevelled surfaces 45. In this case, the sector body is made of perforated metal sheet 50 extending around a reinforcing web 51. The lower ends 52 of the perforated metal are bent in at substantially the same angle as the bevel edge 45 of the sector bell, and the inner end 53 of the filter media 9 is tucked in between the surfaces 52 and 45, and, when the sectors are clamped in position on the shaft, it is locked therebetween. By using the bevelled surfaces on the sector bell, the filter media makes a very smooth joint with the outer surface of the sector bell, and no undue strain is exerted on the filter medium. This is especially important where the filter medium is wire cloth, since sharp corners would tend to rupture the strands of the filter media. Usually the filter medium is subjected alternately to suction and pressure in the filtration cycle so a substantial strain is exerted on the filter medium, and, where there are points of strain such as sharp bends, the filter medium will tend to rupture more freely than straight unstrained surfaces.

By using the loose fitting vertical pin in the back vise or blade support 16, the blade may be easily dropped into place from the operating floor without getting back into the confined position to manipulate the inner end of the blade next to the shroud. For the large diameter filters, this is a very important feature and the discs are so close together that it is crowded and difficult to work between the two discs. With the loose fit, the inner end of the blade is assembled with its support by merely placing the blade vise over the vertical pin; the weight of the blade holds the assembly in position on the pin. Since the direction of rotation, as indicated in Fig. 1, is toward the working edge 18 of the blade, the blade assembly will tend to remain in its position supported between the vertical pin 29 on the inner end and the angle support 23 on the outer ends. The looseness of the fit of the pin in the bore 31 not only permits the blade to tilt into the sector, but also allows the space to be filled with grease and prevent rust or solid matter accumulation causing a freezing and sticking of the blade assembly.

Figure 8:
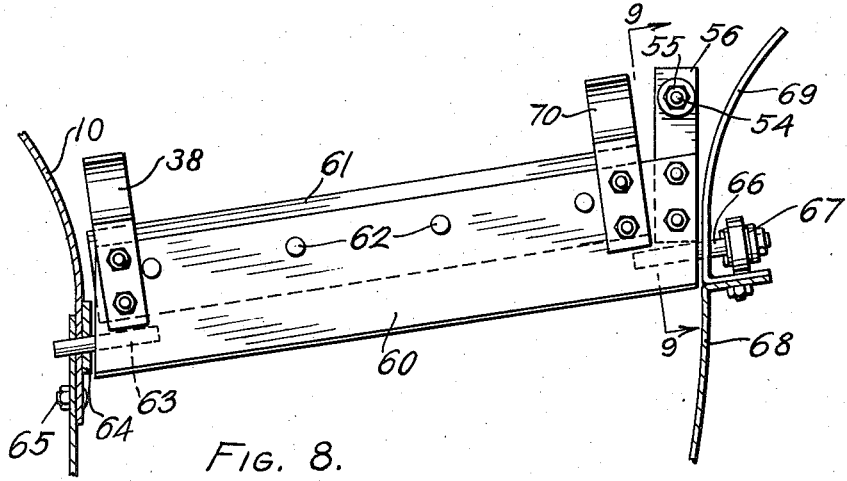
Fig. 8 is a side elevation of a modified scraper mount assembly for a disc filter.

The modified blade assembly of Fig. 8 includes scraper blade 60 having a tip 61 of rubber or other material secured thereto by bolt and nut assemblies 62 or other suitable means. The back of the blade 60 is rotatably mounted on a stub shaft 63. The stub shaft 63 is secured to an adjusting plate 64 which is adjustably held on the shroud 10 by an adjusting bolt and nut assembly 65. The front end of the blade is rotatably mounted on a stub shaft 66 which is mounted on a roller carriage 67. The carriage is reciprocally supported on a front support 68 to which is secured a front shroud 69. The carriage 67 rolls back and forth on the front support as the adjustment of the disc changes. A guide shoe 70 mounted on the blade 60 is arranged to ride on the front clamp of a disc. A tension arm is mounted on the blade in front of the guide shoe 70. The spring tension attachment between the two blades for each disc is shown in Fig. 9, priorly described.

The arrangement of Fig. 8 is useful for smaller filters where there is not sufficient room for the back mount of Fig. 1. The fit of the stub shafts in the blades should be loose and the space between them filled with heavy grease as in the other mounting to prevent freezing and sticking. The spring tension mounting may be used on any disc filter where it is desired to maintain alignment of the blades on a disc. Since the back mount is loose the spring tension will hold the blade in alignment along its scraping edge along the filter surface.

Figure 10:
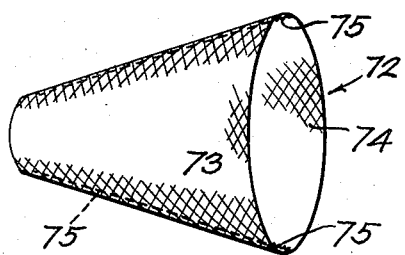
Fig. 10 is a perspective view of a filter media cover for a disc sector.

The filter septum of Fig. 10 is indicated in general by the number 72 and is two truncated triangular pieces 73 and 74 secured together along both edges 75. The septum when so assembled forms a conical member which is arranged to cover the individual sectors of the discs, as described below. The cone-shaped sector covers may be made of wire cloth in which case the seams are welded, or from cloth with sewn seams, plastic cloth with heat or chemically sealed seams, etc. The truncated triangular segments may be cut from a strip of material with very little loss of material. The conical shape eliminates a substantial portion of the staples holding the septum on the sector, and reduces the time of dressing the filter by as much as 75%. On completing the sector assembly, the staples are not used to hold the septum in place as this is the function of claim 5. The staples used in holding filter septum on a sector have a tendency to rust off and particularly is this so in corrosive pulps. With the conical septum the staples are merely for assembly and the rusting off of such members is immaterial since the septum is held by the clamp and the bell. With a cloth septum the edges may be reinforced to prevent tearing under the tautness to which it is subjected.

Figure 11:
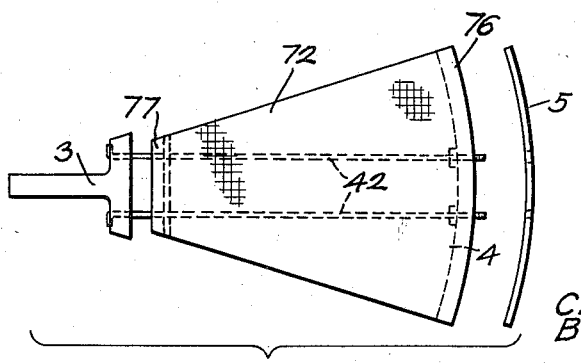
Fig. 11 is a side elevation of a disc sector illustrating the assembly of the component parts.

In assembling the conical septum on a sector, illustrated in Fig. 11, the septum or medium 72 is pulled over the sector body 4 so that there is a lap 76 at the large edge of the body 4 and a lap 77 at the small edge of the body. By having the angle of the seams substantially the same as the angle of the sides of the sector body, the septum may be drawn tight on the sector. The lap 76 is pulled to make the septum taut, and it is then folded over and stapled to hold the septum in place until assembly. The excess lap 77 is cut off and the remaining lap is tacked on the bevel at the bell 3 which is pulled up and held in place by rods 42 as before described. The seams of the conical septums are pressed in grooves along the sides of the sectors which accommodate rods 6. Such an assembly is quickly accomplished with considerable economy of time and material, and it leaves the bell unobstructed for the use of a back guide shoe as above.

While the invention has been illustrated by reference to specific devices, there is no intention to limit the invention to the precise details so set forth, except insofar as defined in the following claims.

We claim:

1. The combination with a rotary leaf filter having a plurality of sectors arranged radially and in side-by-side relation to form at least one disc filter unit, each sector including an inner bell portion and an outer body portion arranged with the outermost surface of the bell portion bevelled inwardly to provide a seat for a covering portion of filter media mounted on the body portion, and said body portion having a surface disposed in proximity to said bevelled surface so as to lock said media in a fixed position therebetween, of an elongated scraper member having a cake-contacting surface mounted on each side of said circumferential unit and arranged to strip the cake from the succession of sectors during rotation of the filter unit, said scraper being supported at its back and front ends so as to suspend its working surface in spaced and floating relation to the adjacent filter media with which it is in register, means for maintaining said scraper members in spaced relation to said unit, and said front support including sector contacting means arranged to maintain a substantially uniform spacing between the outer end of said working surface and the associated filter media.

2. A combination in accordance with claim 1 in which the means for maintaining the spaced relation of the scraper members is a spring urging the outer portions of said scraper members toward each other.

3. The combination with a rotary leaf filter having a plurality of sectors arranged radially and in side-by-side relation to form at least one disc filter unit, each said sector including an inner bell portion and an outer body portion arranged with the outermost surface of the bell portion bevelled inwardly to provide a seat for a covering portion of filter media mounted on the body portion, and said body portion having a coacting surface disposed in proximity to said bevelled surface so as to lock said media in a fixed position therebetween, of an elongated scraper member having a cake-contacting surface mounted on each side of said circumferential unit and arranged to strip the cake from the succession of sectors during rotation of the filter unit, said scraper being supported at its back and front ends so as to suspend its working surface in spaced and floating relation to the adjacent filter media with which it is in register, said back support including a detachable, flexible joint and a back guide contacting the sector surface beyond the media so as to space the working edge of the scraper from the media, means for maintaining said scraper members in spaced relation to said unit, and said outer support including sector contacting means arranged to maintain a substantially uniform spacing between the outer end of said working surface and the associated filter media.

4. The combination with a rotary leaf filter having a plurality of sectors arranged radially and in side-by-side relation to form at least one disc filter unit, each said sector including an inner bell portion and an outer body portion arranged with the outermost surface of the bell portion bevelled inwardly to provide a seat for a covering portion of filter media mounted on the body portion, and said body portion having a coacting surface disposed in proximity to said bevelled surface so as to lock said media in a fixed position therebetween, of an elongated scraper member having a cake-contacting surface mounted on each side of said sectors and arranged to strip the cake from the succession of sectors during rotation of the filter unit, said scraper members being supported at their back and front ends so as to suspend their working surfaces in spaced and flowing relation to the adjacent filter media with which they are in register, the back support of each scraper including a flexible joint and a back guide contacting the sector surfaces beyond the media so as to space the working edge of the scraper from the media, and said front support including interconnected sector contacting means arranged to maintain a substantially uniform spacing between each outer end of each said working surface and the associated filter media, and each flexible joint and back guide coacting with its corresponding front support to maintain said working surface substantially parallel to the surface of said filter media.

5. The combination with a rotary leaf filter having a plurality of sectors arranged radially and in side-by-side relation to form at least one disc filter unit, each sector including an inner bell portion and an outer body portion arranged with the outermost surface of the bell portion bevelled to provide a seat for a covering portion of filter media mounted on the body portion so as to provide unobstructed surfaces on the sides of said bell, said body portion having a surface disposed in proximity to said bevelled surface so as to lock the filter media in fixed position therebetween, of a scraper assembly comprising two scraper blades interconnected at their front ends by a member adapted to slide on a supporting surface and holding said associated ends in uniformly spaced relation, the inner end of each blade member being connected to a supporting member having a socket for reception of a pivot pin of lesser diameter than the socket, and a leaf-contacting guide positioned at the back end of each said blade member and arranged to slide on said unobstructed side surfaces of said bell portion so as to maintain a uniform spacing relationship between each said blade and the surface of the filter with which it is in register.

6. The combination with a rotary leaf filter having a plurality of sectors arranged radially and in side-by-side relation to form at least one disc filter unit, each said sector including an inner bell portion and an outer bell body portion arranged with the outermost surface of the bell portion bevelled inwardly to provide a seat for a covering portion of filter media mounted on the body portion so as to provide unobstructed side surfaces of said bell, and said body portion having a coacting surface disposed in proximity to said bevelled surface so as to lock said media in a fixed position therebetween, of a scraper assembly comprising two scraper blades interconnected under spring tension at their front ends by a member adapted to slide on a supporting surface and holding said associated ends in uniformly spaced relation, front guide shoes mounted on each said blade and arranged to support the front ends thereof at a selected distance from the associated surfaces of the sectors, the back end of each said blade member being connected to a supporting member having a socket for reception of a loosely fitting pivot pin arranged to permit angular movement of the blade, and a leaf-contacting guide positioned at the back end of said blade member arranged to slide on the unobstructed bell portions and coacting with said interconnected front ends to maintain a uniform spacing relationship between the working surface of each said blade and the surface of the filter media with which it is in register.

7. The combination with a rotary leaf filter having a plurality of sectors arranged radially and in side-by-side relation to form at least one disc filter unit, each said sector including an inner bell portion and an outer body portion, of an inwardly bevelled outermost surface of the bell portion arranged to provide a seat for a covering portion of filter media mounted in filtering relation on the body portion, and said body portion having a coacting surface disposed in proximity to said bevelled surface so as to lock said media in a fixed position therebetween.

8. The combination with a rotary leaf filter having a plurality of sectors arranged radially and in side-by-side relation to form at least one disc filter unit, each said sector including an inner bell portion and an outer body portion, of an inwardly bevelled outermost surface of the bell portion arranged to provide a seat for a covering portion of filter media mounted in filtering relation on the body portion, and said body portion having a coacting bevelled surface disposed in proximity to said bevelled surface so as to lock said media in a fixed position therebetween.

9. The combination with a rotary leaf filter having a plurality of sectors arranged radially and in side-by-side relation to form at least one disc filter unit, each said sector including an inner bell portion and a generally triangular outer body portion, of a conical filter septum arranged for covering said sector body and for mounting between said bell portion and the adjoining end of said body, and the large end of said conical septum extending beyond the end of said sector body for folding over said end to thereby draw the septum taut on said body.

10. The combination in accordance with claim 9 in which the conical filter septum is filter cloth made of two generally truncated triangular members secured together along the side edges thereof, the edges of which are at substantially the same angles as the corresponding sides of said triangular body portion.

11. The combination in accordance with claim 9 in which the conical filter septum is woven wire made of two generally truncated triangular members welded together along the side edges thereof, the welded edges of which are at substantially the same angle as the corresponding sides of said triangular portion.

12. The combination in accordance with claim 9 in which the filter septum is composed of two substantially equal sized truncated triangular members mounted in side-by-side relation and having the registering sides secured together.

References Cited in the file of this patent
UNITED STATES PATENTS

| | | |
|---|---|---|
| 617,367 | Solvay | Jan. 10, 1899 |
| 977,209 | Melvin | Nov. 29, 1910 |
| 1,051,160 | Robacher | Jan. 21, 1913 |
| 1,446,448 | Brown | Feb. 27, 1923 |
| 1,678,639 | Genter | July 31, 1928 |
| 2,338,549 | Schriver | Jan. 4, 1944 |

FOREIGN PATENTS

| | | |
|---|---|---|
| 587,642 | Germany | Nov. 6, 1933 |

OTHER REFERENCES

Conkey: Rotary Leaf Pressure Filters Pub. by General American Transportation Corp., 1947; pp. 4 and 5 relied on.